United States Patent
Feuillard et al.

(10) Patent No.: US 8,043,570 B2
(45) Date of Patent: Oct. 25, 2011

(54) DEVICE FOR DIFFUSING VOLATILE AGENTS, PROVIDED WITH A CARTRIDGE EXTRACTION MEANS

(75) Inventors: Vincent Feuillard, Les Mesnit Saint Denis (FR); Didier Loup, Maurepas (FR); Gilles Elliot, Courcouronnes (FR); Petr Stanek, Horice (CZ)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 496 days.

(21) Appl. No.: 12/165,864

(22) Filed: Jul. 1, 2008

(65) Prior Publication Data
US 2009/0072046 A1 Mar. 19, 2009

(30) Foreign Application Priority Data
Jul. 2, 2007 (FR) ..................... 07 04768

(51) Int. Cl.
*A62B 7/08* (2006.01)
*A61L 9/04* (2006.01)
*B05B 9/00* (2006.01)
(52) U.S. Cl. ............ 422/124; 422/123; 239/140; 239/57
(58) Field of Classification Search .................. 239/58, 239/140, 57; 422/123, 124
See application file for complete search history.

(56) References Cited

U.S. PATENT DOCUMENTS
2003/0186643 A1 10/2003 Feuillard et al.
2004/0016818 A1* 1/2004 Murdell et al. ............... 239/34

FOREIGN PATENT DOCUMENTS
EP 1561618 A1 8/2005
EP 1609643 A2 12/2005
FR 2815294 A1 4/2002

OTHER PUBLICATIONS

Search Report No. FR 0704768, dated Feb. 25, 2008, 1 page.
English abstract for EP1561618, extracted from espacenet.com, dated Aug. 10, 2005.
English abstract for FR2815294, extracted from espacenet.com, dated Apr. 19, 2002.
English abstract for EP1609643, extracted from espacenet.com, dated Jan. 9, 2009.

* cited by examiner

*Primary Examiner* — Kevin Joyner
(74) *Attorney, Agent, or Firm* — Howard & Howard Attorneys PLLC

(57) ABSTRACT

The invention relates to a diffusion device (1) for an automotive vehicle. The diffusion device (1) comprises a housing (2) with an ambient air inlet (3), a treated air outlet (3), a diffusion chamber (4) and an insert (7). The insert (7) is located inside the diffusion chamber (4) and contains at least one volatile agent (AV1). The insert (7) can rotate via an electric motor (12) for selectively diffusing or not the volatile agent (AV1). The diffusion device (1) also comprises a blower (13) fixed on the housing (2). The insert (7) comprises a member (15) which carries two cartridges (8, 9) containing volatile agent. The member (15) rotates with the insert (7) and can be axially displaced by extraction means. These extraction means expels the member (15) out of the housing (2) when the user pushes on the cap (14).

17 Claims, 3 Drawing Sheets

DEVICE FOR DIFFUSING VOLATILE AGENTS, PROVIDED WITH A CARTRIDGE EXTRACTION MEANS

RELATED APPLICATIONS

This application claims priority to and all the advantages of French Patent Application No. FR 07/04768, filed on Jul. 2, 2007.

The present invention relates to a device for diffusing volatile agents in a motor vehicle.

One particularly advantageous application of the invention is in the field of diffusing fragrances within motor vehicles.

In the field of volatile agent diffusion in the passenger compartment of a vehicle, there are several types of diffuser. For example, a diffusion device housed in the ventilation, heating and/or air-conditioning system of the vehicle is known.

However, this known volatile agent diffusion device of the prior art has the drawback that the user motorist has to carry out a manual operation in order to replace a spent cartridge with a new cartridge. This is because, since the ventilation, heating and/or air-conditioning system is generally beneath the dashboard of the vehicle, it will be understood that to replace the cartridge requires several components of the vehicle, such as the dashboard itself and the central console to be dismantled. Consequently, a user cannot easily change the volatile agent cartridge.

A diffusion device is also known that comprises a housing having an ambient air inlet, a treated air outlet and a diffusion chamber in which a cartridge containing a volatile agent is placed. This diffusion device is integrated into a dashboard between two aerators. The ambient air inlet and the treated air outlet are located in one of the aerators. This type of device has the drawback of being a manual device. In other words, to change the volatile agent requires considerable manipulation by a passenger, consisting in unlocking the cartridge containing the volatile agent, withdrawing the wick from the cartridge, introducing a fresh wick into the cartridge and finally refitting the cartridge into the housing.

One object of the invention is therefore to provide a volatile agent diffusion device that gives the user the option of replacing a cartridge with another in a very simple and almost automatic manner, without having to carry out complicated and time-consuming operations.

This object is achieved, in accordance with the invention, thanks to a diffusion device for diffusing at least one volatile agent in a motor vehicle, comprising a housing having an ambient air inlet, a treated air outlet and a diffusion chamber capable of receiving an insert, at least one volatile-agent cartridge, said device further including an actuator for rotating the insert about the axis A, this device being noteworthy in that said insert comprises a cradle carrying said cartridge, said cradle being linked to the insert so as to rotate therewith and being mounted so as to be free to undergo axial translation on the insert, and in that said device includes extraction means for extracting said cradle from said housing by axial translation parallel to the A axis.

Thus, by acting on said extraction means, it is possible to disengage the cradle from the housing and therefore have access to the cartridge or cartridges located therein. This allows cartridge replacement to be carried out in a very simple manner.

It will also be noted that the invention has the advantage of being able to place several cartridges in the cradle, and not just a single one as in the known device. The motorist can then choose that one of the cartridges that he wishes to use.

According to one embodiment of the invention, said extraction means comprise an extraction slide housed in the diffusion chamber and containing said insert, and axial translation drive means for driving said slide out of the housing, the extraction slide being capable of driving said cradle out of the housing under the action of said axial translation drive means.

To prevent a cartridge from being able to be replaced while for example the diffusion device is in operation, the invention provides for said drive means to be blocked for any angular position of the cradle about the A axis different from a given angular extraction position. In other words, it is necessary, for replacing a cartridge, to bring the cradle, by rotation about the A axis, into a specific angular position, called the extraction position, it being possible for the axial translation drive means for driving the slide to be operated only when the cradle is in an angular extraction position.

Advantageously, said axial translation drive means are actuated by an axial pressing action on said extraction slide. This mode of actuation is particularly simple and requires very little effort and attention.

More precisely, said device includes locking means for locking the extraction slide in the housing, said locking means being able to be released under said axial pressing action. Since the slide locking means are thus released by the axial pressure exerted by the user, the drive means can then extract the slide from the housing.

To make the above arrangement effective, whereby any replacement of a cartridge is prevented outside the extraction position of the cradle, the invention provides for the extraction slide and the insert to include stop means designed to stop the locking means from being released under said axial pressing action when the cradle is in an angular position different from said angular extraction position.

According to one particular embodiment of the invention, said diffusion chamber has a larger-diameter sector intended to limit the radial compression of means for sealing the cartridge in the extraction position. This feature facilitates the translation movement of the slide by reducing the rubbing introduced by said sealing means.

To prevent the diffusion device from operating when the slide is in the open position, the invention provides for said device to be equipped with a slide opening detector capable of delivering a signal for switching off said device when the slide is out of the housing.

According to the invention, the slide is provided with a plug having means for radially distributing the treated air. In particular, said plug is a hollow cylinder of axis A, said radial distribution means consisting of at least one lateral hole made in said cylinder.

This system for distributing the volatile agent has the two advantages of being more attractive and more effective than the known systems in terms of homogeneity of the treated air inside the vehicle.

The following description in conjunction with the appended drawings, given by way of non-limiting examples, will make it clearly understood what the invention consists of and how it can be realized.

Figure 1:
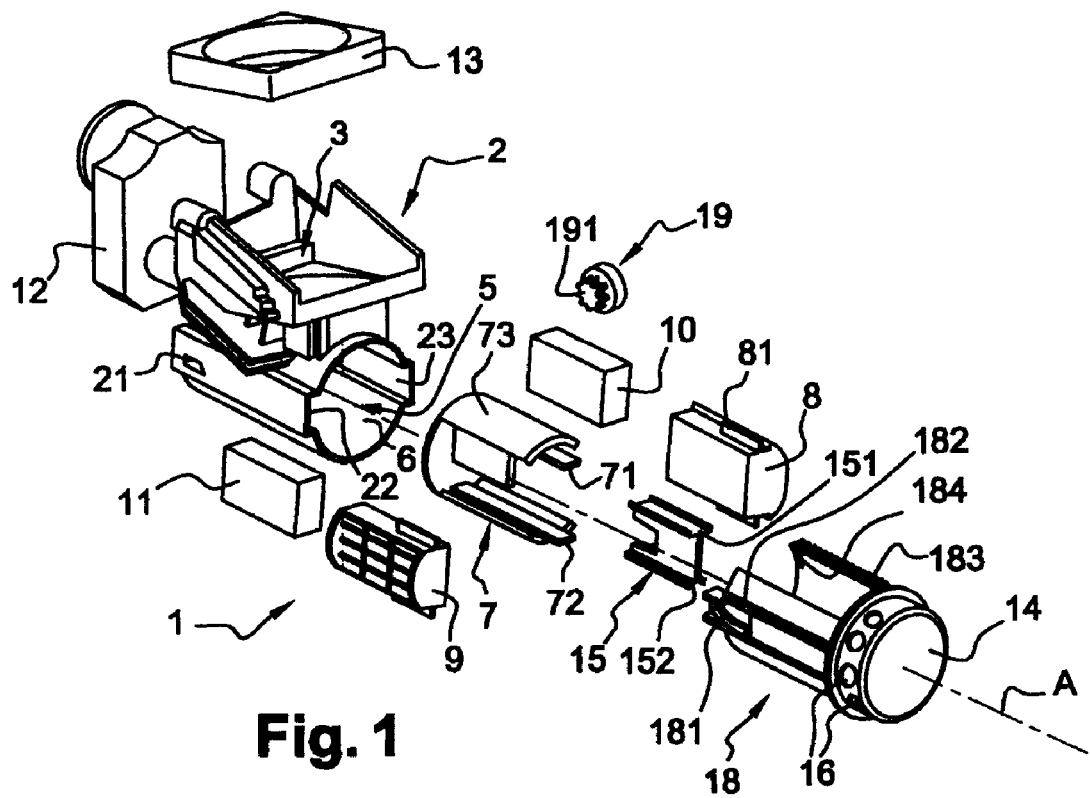
FIG. 1 is an exploded perspective view of a diffusion device according to the invention.

Shown in FIG. 1 in an exploded view is a device 1 for diffusing volatile agents in a motor vehicle. These volatile agents are generally fragrances impregnated in wicks, there being two wicks, referenced 10 and 11 respectively, corresponding to different fragrances in the example shown in FIG. 1. In practice the wicks 10, 11 are inserted into cartridges 8, 9 so as to be mounted in the diffusion device 1 in a manner that will be explained later.

The diffusion device 1 comprises a housing 2 having an ambient air inlet 3 coming from a ventilator 13 and intended to penetrate a diffusion chamber 6 in which the volatile-agent cartridges 8, 9 are placed. As shown in FIG. 1, the diffusion chamber 6 has an approximately cylindrical shape of axis A, which constitutes the axis about which the main functions of the diffusion device 1 are organized.

Upon passing into the diffusion chamber 6, the ambient air becomes laden with one or other of the fragrances. The air thus perfumed leaves the diffusion chamber 6 via a treated air outlet 5 towards a plug 14 which has means for radially distributing the treated air coming from the outlet 5 about the A axis. In the exemplary embodiment shown in FIG. 1, said plug 14 takes the form of a hollow cylinder of axis A, said radial distribution means then being lateral holes 16 provided in the cylindrical wall of the plug 14.

There are many advantages of this method of distributing the treated air. From the aesthetic standpoint, the plug 14 makes it possible to replace an opening and a front-facing grille, which are generally unattractive, by a component in which the distribution holes are much more discreet and therefore less visible. From a technical standpoint, the lateral outlets through the holes 16 reorient the treated air in the direction of the aerators between which the diffusion device 1 is fitted. This rapidly provides homogeneous mixing of the treated air with the air coming from the aerators, and also rapid diffusion and perception of the perfumed air throughout the vehicle.

It may be seen in FIG. 1 that the cartridges 8, 9 are mounted on a cradle 15, which is introduced into a cylindrical insert 7 coaxial with the diffusion chamber 6 by beams 71, 72 of the insert 7 sliding along rails 151, 152 of the cradle 15. When the insert 7 provided with the cradle 15 bearing the cartridges 8, 9 is placed inside the diffusion chamber 6, an actuator 12—for example a stepper motor—allows the insert 7, and therefore the cradle 15 and the cartridges 8, 9, to rotate about the A axis, since, by construction, the cradle 15 is linked to the insert 7 so as to rotate therewith. However, the cradle 15 remains mounted so as to be free to undergo axial translation along the A axis on the insert 7.

By rotating the insert 7 about the A axis, the actuator 12 allows the cartridges to be brought into the following various functional positions.

Figure 2:
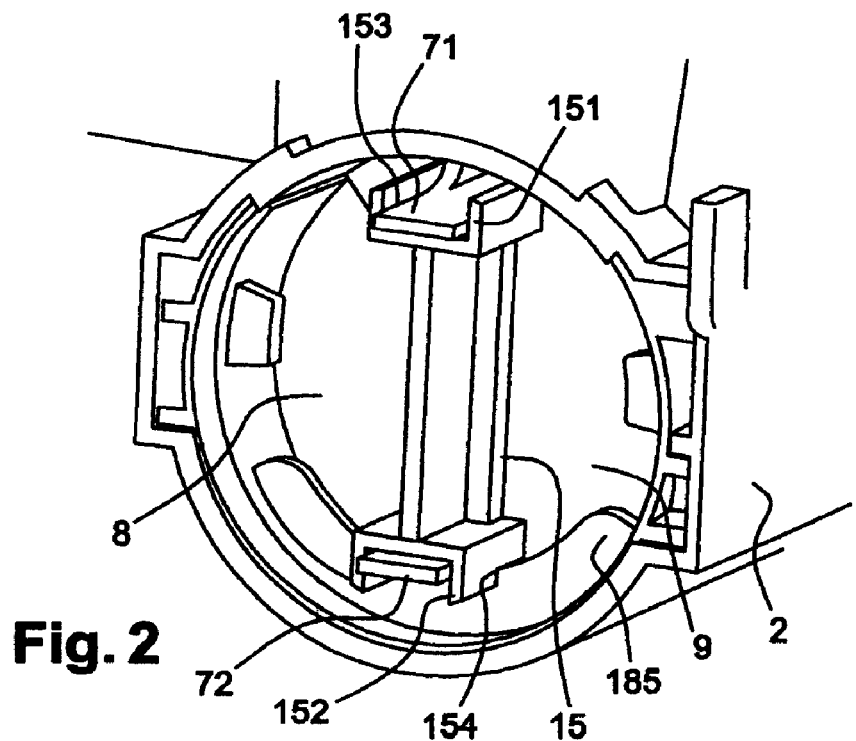
FIG. 2 is a perspective view of the cradle of the device of FIG. 1 in the OFF position.

In the position shown in FIG. 1, which also corresponds to that of FIG. 2, the diffusion device 1 is not in operation (in the OFF position) since, in this case, a wall 73 of the insert 7 completely blocks off the ambient air inlet 3.

Figure 3:
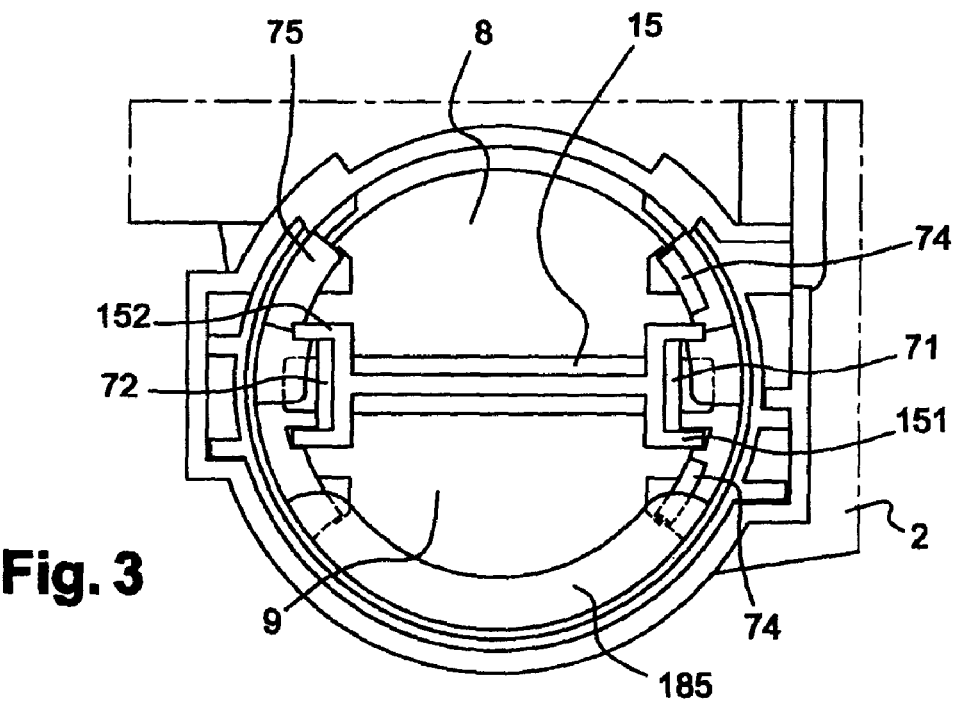
FIG. 3 is a front view of the cradle of the device of FIG. 1 in the max. ON position for a cartridge.
Figure 5:
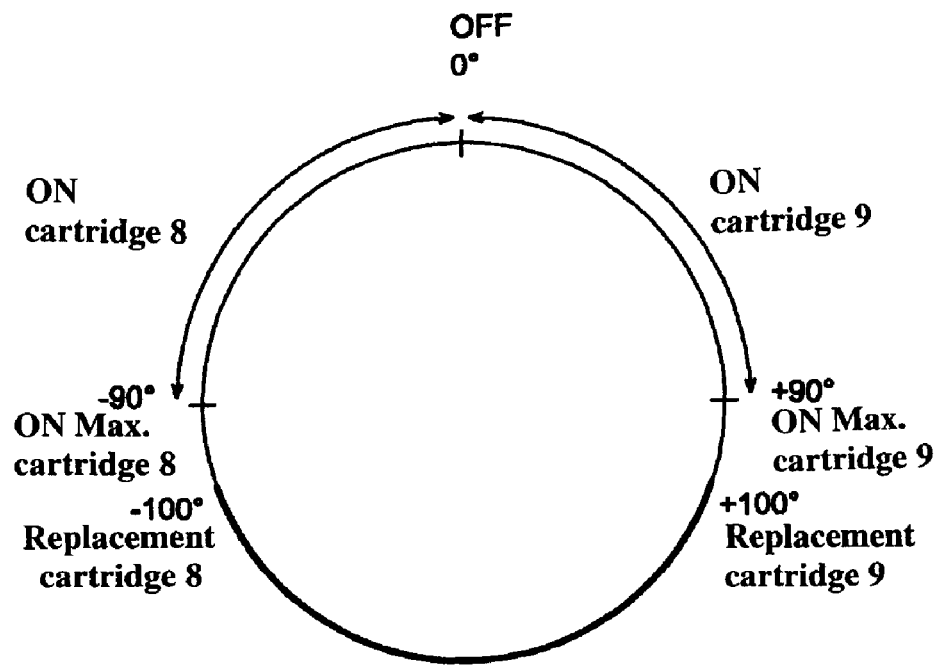
FIG. 5 is a diagram of the angular positions of the actuator of the device of FIG. 1.

When the actuator 12 rotates the insert 7 through 900 in one direction or the other from the OFF position, the cartridge 8 or the cartridge 9 is brought into a maximum diffusion position (max. ON position) as indicated in FIG. 3 in which the cartridge 8 is in the max. ON position. Intermediate ON positions between the OFF position and the max. ON position are of course possible. FIG. 5 shows the OFF position of the actuator 12 and the max. ON angular positions ±90° from the OFF position. In an ON position, the ambient air introduced through the inlet 3 becomes laden with fragrance corresponding to the active cartridge, the cartridge 8 in the example illustrated in FIG. 3, and flows into the device 1 as far as the radial distribution plug 14.

To allow the user to change a spent cartridge for a new cartridge, the diffusion device 1 of FIG. 1 includes automatic extraction means for extracting the cradle 15 from the housing, which means will now be described in detail.

As indicated in FIG. 1, these extraction means comprise an extraction slide 18 of approximately cylindrical shape of axis A, which in diffusion mode of the device 1, is held in the diffusion chamber 6 and contains the insert 7 with the cradle 15. The slide 18 is not coupled to the actuator 12 so that it undergoes no rotational movement, even when the actuator 12 is operating—in this case, only the insert 7 and the cradle 15 can rotate about the A axis.

Said extraction means further include axial translation drive means for driving, along the A axis, the slide 18 out of the housing 2. Moreover, provision is made in its axial translation movement for the slide 18 to also drive the cradle 15 out of the housing 2, it being recalled that said cradle is free to undergo translation relative to the insert 7. It will therefore be understood that, if the axial translation takes place over a distance at least equal to the length L of the cartridges 8, 9 taken parallel to the A axis, it is possible for one of the cartridges to be completely disengaged and thus replaced if it is spent.

In an advantageous embodiment, the axial translation drive means for driving the slide 18 are chosen to be of the "push-pull" type, that is to say those actuated by an axial pressing action by the user on the extraction slide 18.

More precisely, as indicated in FIG. 1, these means consist of compression springs (not shown) placed in grooves 22, 23 provided in the diffusion chamber 6 and cooperating with guides 182 for the slide 18. When means for locking the slide 18 in the housing are released by axial pressure, the initially compressed springs can then relax and apply an axial translation movement to the slide suitable for extracting the slide 18 and the cradle 15 from the housing 2.

Figure 6:
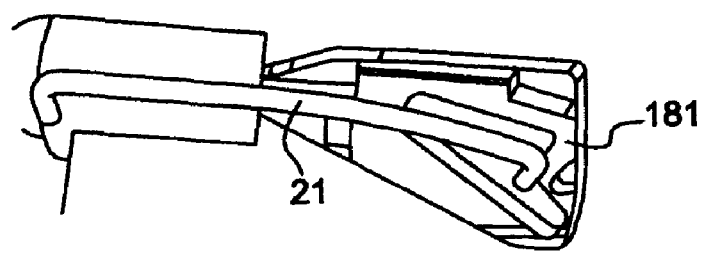
FIG. 6 is a perspective view of means for locking the extraction slide in the housing of the device of FIG. 1.

FIGS. 1 and 6 show means for locking the slide 18 in the housing 2, said means consisting of a cam 181 provided on the slide 18, cooperating with a flexure spring 21 placed on the housing. In the diffusion mode of the device 1 the flexure spring 21 retains the slide 18 in the housing. If the user decides to change one of the cartridges 8, 9, he presses on the button 14 so as to make it travel a few millimetres, this having the effect of the releasing the cam 181 from the flexure spring 21 and therefore allowing the compression springs to exert their axial drive function, namely to drive the slide 18 out of the housing 2.

For controlling the rate of extraction of the slide 18 and of preventing end-of-travel clattering, means for damping the translation movement of the slide 18 are provided, for example consisting of a rack 183 placed longitudinally on the slide 18 and a grease damper 19 having a pinion 191 meshing with the rack 183.

After having changed the cartridge, the user closes the slide 18 by manually pushing it against the force of the compression springs until the flexure spring 21 locks the cam 181.

Figure 4:
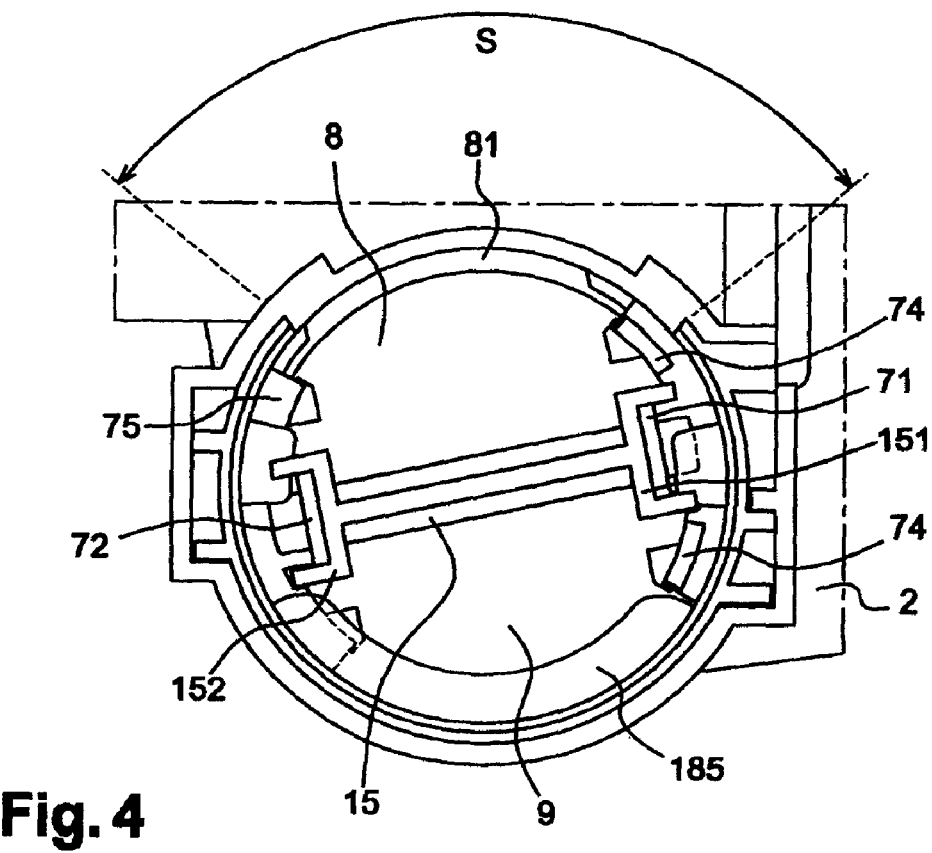
FIG. 4 is a front view of the cradle of the device of FIG. 1 in the position for replacing a cartridge.

To prevent any replacement of a cartridge while the diffusion device 1 is in the OFF position or in an ON position, the invention provides for such replacement to be possible only if the cradle 15 is rotated about the A axis by the actuator 12 into one or other of two specific angular extraction positions, each corresponding to the replacement of one of the cartridges 8 or 9, as shown in FIG. 5. These extraction positions are about 10° away from the ±90° max. ON positions. The total angular travel of the actuator is therefore about 200°. FIG. 4 shows more particularly the cartridge 8 in its angular extraction position.

When the cradle 15 is in an angular extraction position corresponding to the replacement of one or other of the cartridges 8, 9, the slide 18 can drive the cradle 15 out of the housing 2 thanks to a catching lug 184 placed at the distal end of the slide and cooperating with the cradle 15.

Outside these specific angular extraction positions, the means for locking the slide 18 in the housing 2 are blocked in the locking position and therefore insensitive to any axial pressing action on the slide 18. This situation is represented in FIGS. 2 and 3 in which the cradle 15 is shown in OFF and max. ON angular positions, which are therefore different from the angular extraction positions. It may be seen in these figures that there are stop means intended to limit the travel of the slide 18 under the action of axial pressure to a value less than the travel of a few millimetres needed to release the cam 181, or even a zero value.

These stop means shown in FIGS. 2 and 3 comprise a wall 185 provided on a peripheral sector of the slide 18.

In the OFF position shown in FIG. 2, notches 153, 154 on the cradle 15 press against the wall 185 so that the slide 18 is prevented from being in axial translation and therefore unable to undergo the travel needed to release the locking means. Any axial pressing action is therefore neutralized.

In the case of FIG. 3, an actual stop 74 is placed on the insert 7 so that, in all the positions different from the angular extraction positions—max. ON in the example shown in FIG. 3—said stop 74 is in contact with the wall 185 or at all events at a distance shorter than the travel for releasing the locking means. Here again, any axial pressing action on the slide 18 is neutralized as the wall 185 is blocked against the stop 74.

However, in the case shown in FIG. 4 in which the cradle is in an angular extraction position, the stop 74 is offset relative to the wall 185, thus allowing the slide 18 to undergo the travel to release the cam 181. A second stop 75, offset depthwise relative to the first stop 74, makes it possible at will to limit this travel to the required minimum value of a few millimetres so as to avoid the effects of too strong a pressing action on the slide 18.

Finally, it may be seen in FIG. 4 that the diameter of the diffusion chamber 6 is greater over a sector S in which a sealing lip 81 of the cartridge 8 in the replacement position is in contact with the inner wall of the chamber 6. This arrangement has the advantage of limiting undesirable rubbing due to the compression of this sealing lip against the wall of the chamber 6 during extraction of the slide 18. The translation movement of the slide 18 is therefore facilitated.

Of course, the choice of the active cartridge, the diffusion intensity adjustment (ON positions), the stopping of the diffusion (OFF position) and the request to replace a given cartridge may be carried out by the user by means of an electronic control unit located on the dashboard of the vehicle.

To prevent the diffusion device 1 from being able to be placed in an ON position while the slide 18 is outside of the housing 2 during a cartridge replacement, a slide opening detector (not shown) for detecting that the slide 18 is open is placed on the housing 2 and delivers a signal for switching off the device 1 to the control unit.

The invention claimed is:

1. A diffusion device (1) for diffusing at least one volatile agent in a motor vehicle, said device comprising a housing (2) having an ambient air inlet (3), a treated air outlet (5), an insert (7), and a diffusion chamber (6) capable of receiving said insert (7), at least one volatile-agent cartridge (8, 9), said device further including an actuator (12) for rotating said insert (7) about a rotation axis A, characterized in that said insert (7) comprises a cradle (15) carrying said cartridge (8, 9), said cradle (15) being linked to the insert (7) so as to rotate therewith and being mounted so as to be free to undergo axial translation on the insert (7), and in that said device (1) includes extraction means for extracting said cradle (15) from said housing (2) by translation parallel to the A axis.

2. A diffusion device according to claim 1, in which said diffusion chamber (6) has a larger-diameter sector (S) intended to limit the radial compression of a means (81) for sealing the cartridge (8) in an extraction position.

3. A diffusion device according to claim 1, in which said extraction means comprise an extraction slide (18) housed in the diffusion chamber (6) and containing said insert (7), and axial translation drive means for driving said slide (18) out of the housing (2), the extraction slide (18) being capable of driving said cradle (15) out of the housing (2) under the action of said axial translation drive means.

4. A diffusion device according to claim 3, in which said drive means are blocked for any angular position of the cradle about the A axis different from a given angular extraction position.

5. A diffusion device according to claim 4, in which the cradle (15) is brought to said angular extraction position by means of said actuator (12).

6. A diffusion device according to claim 3, in which said axial translation drive means are actuated by an axial pressing action on said extraction slide (18).

7. A diffusion device according to claim 6, in which said axial translation drive means comprise at least one spring capable of driving the slide (18) in axial translation.

8. A diffusion device according to claim 6, which includes locking means (181, 21) for locking the extraction slide (18) in the housing (2), said locking means being able to be released under said axial pressing action.

9. A diffusion device according to claim 8, in which said locking means comprise a cam (181) provided on the slide (18) and cooperating with a flexure spring (21) placed in the housing (2).

10. A diffusion device according to claim 6, in which the extraction slide (18) and the insert (7) include stop means (185, 153, 154; 74) designed to stop the locking means (181, 21) from being released under said axial pressing action when the cradle (15) is in an angular position different from said angular extraction position.

11. A diffusion device according to claim 4, in which the extraction slide (18) and the insert (7) include stop means (185, 153, 154; 74) designed to stop a locking means (181, 21) from being released under said axial pressing action when the cradle (15) is in an angular position different from said angular extraction position.

12. A diffusion device according to claim 3, which includes means (183, 19) for damping the axial translation movement of the slide (18).

13. A diffusion device according to claim 3, which includes a slide opening detector capable of delivering a signal for switching off said device (1) when the slide (18) is out of the housing (2).

14. A diffusion device according to claim 3, in which the slide (18) is provided with a plug (14) having means (16) for radially distributing the treated air.

15. A diffusion device according to claim 3, in which said diffusion chamber (6) has a larger-diameter sector (S) intended to limit the radial compression of means (81) for sealing the cartridge (8) in the extraction position.

16. A diffusion device according to claim 3, which includes a slide opening detector capable of delivering a signal for switching off said device (1) when the slide (18) is out of the housing (2).

17. A diffusion device according to claim 3, in which the slide (18) is provided with a plug (14) having means (16) for radially distributing the treated air.

\* \* \* \* \*

UNITED STATES PATENT AND TRADEMARK OFFICE
CERTIFICATE OF CORRECTION

| | |
|---|---|
| PATENT NO. | : 8,043,570 B2 |
| APPLICATION NO. | : 12/165864 |
| DATED | : October 25, 2011 |
| INVENTOR(S) | : Feuillard et al. |

It is certified that error appears in the above-identified patent and that said Letters Patent is hereby corrected as shown below:

ON THE FACE OF PATENT:

Title Page, Section (75) Inventors: after "Vincent Feuillard", please delete "Les Mesnit Saint Denis (FR)" and replace with -- Les Mesnil Saint Denis (FR) --

Signed and Sealed this
Twenty-ninth Day of May, 2012

David J. Kappos
*Director of the United States Patent and Trademark Office*